US009735850B2

(12) United States Patent
Khlat et al.

(10) Patent No.: US 9,735,850 B2
(45) Date of Patent: Aug. 15, 2017

(54) HIGH LINEARITY ANTENNA SWAPPING CIRCUITRY

(71) Applicant: RF Micro Devices, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/084,142

(22) Filed: Mar. 29, 2016

(65) Prior Publication Data
US 2016/0373176 A1     Dec. 22, 2016

Related U.S. Application Data

(60) Provisional application No. 62/180,648, filed on Jun. 17, 2015.

(51) Int. Cl.
| | |
|---|---|
| *H04B 1/44* | (2006.01) |
| *H04B 7/06* | (2006.01) |
| *H04B 1/00* | (2006.01) |
| *H04B 1/401* | (2015.01) |

(52) U.S. Cl.
CPC ......... *H04B 7/0608* (2013.01); *H04B 1/0064* (2013.01); *H04B 1/401* (2013.01)

(58) Field of Classification Search
CPC . H04B 1/48; H04B 1/44; H04B 1/406; H04B 1/525; H04B 1/18; H04B 1/0475; H04B 15/02; H04B 1/04

USPC ........................ 455/77, 78, 101, 114.1, 553.1
See application file for complete search history.

(56) References Cited

U.S. PATENT DOCUMENTS

| | | | | |
|---|---|---|---|---|
| 6,560,443 | B1 * | 5/2003 | Vaisanen ................. | H01Q 3/24 455/553.1 |
| 6,609,010 | B1 * | 8/2003 | Dolle ..................... | H04B 1/005 370/208 |
| 7,400,862 | B2 * | 7/2008 | Domino ................. | H04B 1/005 333/103 |
| 9,002,282 | B1 * | 4/2015 | de la Broise ............ | H04B 1/40 375/144 |

\* cited by examiner

*Primary Examiner* — Nhan Le
(74) *Attorney, Agent, or Firm* — Withrow & Terranova, P.L.L.C.

(57) ABSTRACT

Antenna swapping circuitry includes a first pole, a second pole, a first throw, a second throw, and a number of switching elements. A first switching element is coupled between the first pole and the first throw. A second switching element is coupled between the first pole and the second throw. A third switching element is coupled between the second pole and the first throw. A fourth switching element is coupled between the second pole and the second throw. A linearity of the first switching element and the fourth switching element is higher in a closed state of operation than in an open state of operation. A linearity of the second switching element and a third switching element is higher in an open state of operation than in a closed state of operation.

14 Claims, 7 Drawing Sheets

HIGH LINEARITY ANTENNA SWAPPING CIRCUITRY

RELATED APPLICATIONS

This application claims the benefit of provisional patent application Ser. No. 62/180,648, filed Jun. 17, 2015, the disclosure of which is hereby incorporated herein by reference in its entirety.

FIELD OF THE DISCLOSURE

The present disclosure relates to antenna swapping circuitry, and specifically to antenna swapping circuitry including improvements to the linearity thereof.

BACKGROUND

Modern wireless communications devices often include multiple antennas. These multiple antennas are used to improve one or more transmission and/or reception characteristics of the wireless communications device. For example, multiple antennas may be used to implement diversity and/or multiple-input-multiple-output (MIMO) techniques, which improve transmission and reception reliability and throughput. Generally, a primary antenna is used for the transmission and reception of primary transmit and receive signals, while a secondary antenna is used for the reception of secondary receive signals. These antennas may be swapped when the transmission and/or reception characteristics of the secondary antenna are better than those of the primary antenna. This may occur, for example, when a voltage standing wave ratio (VSWR) associated with the secondary antenna is lower than a VSWR associated with the primary antenna. Such functionality is facilitated by antenna swapping circuitry. Generally, antenna swapping circuitry includes a number of switching elements configured to place the various signal paths of transceiver circuitry in communication with either the primary antenna or the secondary antenna.

FIG. 1 is a functional schematic of conventional radio frequency (RF) front end circuitry 10. The conventional RF front end circuitry 10 includes a primary antenna 12A, a secondary antenna 12B, antenna swapping circuitry 14, multiplexer circuitry 16, transceiver switching circuitry 18, primary transceiver circuitry 20, secondary receiver circuitry 22, and switch control circuitry 24. The antenna swapping circuitry 14 is coupled between the multiplexer circuitry 16, the primary antenna 12A, and the secondary antenna 12B. The transceiver switching circuitry 18 is coupled between the multiplexer circuitry 16, the primary transceiver circuitry 20, and the secondary receiver circuitry 22. The switch control circuitry 24 is coupled to the antenna swapping circuitry 14 and the transceiver switching circuitry 18.

The multiplexer circuitry 16 includes a first multiplexer 16A and a second multiplexer 16B. Each one of the first multiplexer 16A and the second multiplexer 16B include a low-band node LB, a mid/high-band node MBHB, and a common node C, and are configured to pass low-band signals between the low-band node LB and the common node C, pass mid/high-band signals between the mid/high-band node MBHB and the common node C, and attenuate other signals.

The primary transceiver circuitry 20 includes low-band primary transceiver circuitry 20A and mid/high-band primary transceiver circuitry 20B. Similarly, the secondary receiver circuitry 22 includes low-band secondary receiver circuitry 22A and mid/high-band secondary receiver circuitry 22B. The transceiver switching circuitry 18 includes low-band primary transceiver switching circuitry 18A coupled between the low-band primary transceiver circuitry 20A and the low-band node LB of the first multiplexer 16A, mid/high-band primary transceiver switching circuitry 18B coupled between the mid/high-band primary transceiver circuitry 20B and the mid/high-band node MBHB of the first multiplexer 16A, low-band secondary receiver switching circuitry 18C coupled between the low-band secondary receiver circuitry 22A and the low-band node LB of the second multiplexer 16B, and mid/high-band secondary receiver switching circuitry 18D coupled between the mid/high-band secondary receiver circuitry 22B and the mid/high band node of the second multiplexer 16B.

The antenna swapping circuitry 14 includes a first pole P1, a second pole P2, a first throw T1, a second throw T2, and a number of antenna swapping switching elements SW_AS. A first antenna swapping switching element SW_AS1 is coupled between the first pole P1 and the first throw T1. A second antenna swapping switching element SW_AS2 is coupled between the first pole P1 and the second throw T2. A third antenna swapping switching element SW_AS3 is coupled between the second pole P2 and the first throw T1. A fourth antenna swapping switching element SW_AS4 is coupled between the second pole P2 and the second throw T2. The first pole P1 is coupled to the common node C of the first multiplexer 16A. The second pole P2 is coupled to the common node C of the second multiplexer 16B. The first throw T1 is coupled to the primary antenna 12A. The second throw T2 is coupled to the secondary antenna 12B.

The low-band primary transceiver circuitry 20A includes a number of duplexers DUP each including a transmit node T, a receive node R, and a common node C, power amplifier switching circuitry PA_SW, a power amplifier PA, and a number of low-noise amplifiers LNA. The power amplifier PA is coupled to the transmit node T of each one of the duplexers DUP via the power amplifier switching circuitry PA_SW. Each one of the low-noise amplifiers LNA is coupled to a receive node R of a different one of the duplexers DUP. Each one of the duplexers DUP is configured to pass transmit signals within one or more operating bands provided at the common node C to the transmit node T, pass receive signals within the one or more operating bands provided at the receive node R to the common node C, and attenuate other signals. A common node C of each one of the duplexers DUP is coupled to the low-band primary transceiver switching circuitry 18A.

The mid/high-band primary transceiver circuitry 20B similarly includes a number of duplexers DUP each including a transmit node T, a receive node R, and a common node C, power amplifier switching circuitry PA_SW, a power amplifier PA, and a number of low-noise amplifiers LNA. The power amplifier PA is coupled to the transmit node T of each one of the duplexers DUP via the power amplifier switching circuitry PA_SW. Each one of the low-noise amplifiers LNA is coupled to a receive node R of a different one of the duplexers DUP. Each one of the duplexers DUP is configured to pass transmit signals within one or more operating bands provided at the common node C to the transmit node T, pass receive signals within the one or more operating bands provided at the receive node R to the common node C, and attenuate other signals. A common node C of each one of the duplexers DUP is coupled to the mid/high-band primary transceiver switching circuitry 18B.

The low-band secondary receiver circuitry 22A includes a number of receiver filters FIL and a number of low-noise amplifiers LNA. Each one of the low-noise amplifiers LNA is coupled to a different one of the receiver filters FIL. Each one of the receiver filters FIL is in turn coupled to the low-band secondary receiver switching circuitry 18C. Further, each one of the filters FIL is configured to filter receive signals within one or more different operating bands.

The mid/high-band secondary receiver circuitry 22B similarly includes a number of receiver filters FIL and a number of low-noise amplifiers LNA. Each one of the low-noise amplifiers LNA is coupled to a different one of the receiver filters FIL. Each one of the receiver filters FIL is in turn coupled to the mid/high-band secondary receiver switching circuitry 18D. Further, each one of the filters FIL is configured to filter receive signals within one or more different operating bands.

When operating the primary antenna 12A as intended, the switch control circuitry 24 configures the antenna swapping circuitry 14 as shown in FIG. 2. Specifically, the first antenna swapping switching element SW_AS1 and the fourth antenna swapping switching element SW_AS4 are closed, while the second antenna swapping switching element SW_AS2 and the third antenna swapping switching element SW_AS3 are open. Accordingly, the common node C of the first multiplexer 16A is coupled to the primary antenna 12A and the common node C of the second multiplexer 16B is coupled to the secondary antenna 12B. Primary transmit signals provided at the common node C of the first multiplexer 16A from the primary transceiver circuitry 20 are therefore provided to the primary antenna 12A, primary receive signals from the primary antenna 12A are provided to the common node C of the first multiplexer 16A and forwarded to the primary transceiver circuitry 20, and secondary receive signals from the secondary antenna 12B are provided to the common node C of the second multiplexer 16B and forwarded to the secondary receiver circuitry 22.

When the primary antenna 12A and the secondary antenna 12B are swapped, the switch control circuitry 24 configures the antenna swapping circuitry 14 as shown in FIG. 3. Specifically, the second antenna swapping switching element SW_AS2 and the third antenna swapping switching element SW_AS3 are closed, while the first antenna swapping switching element SW_AS1 and the fourth antenna swapping switching element SW_AS4 are open. Accordingly, the common node of the first multiplexer 16A is coupled to the secondary antenna 12B and the common node C of the second multiplexer 16B is coupled to the primary antenna 12A. Primary transmit signals provided at the common node C of the first multiplexer 16A from the primary transceiver circuitry 20 are therefore provided to the secondary antenna 12B, primary receive signals from the secondary antenna 12B are provided to the common node C of the first multiplexer 16A and forwarded to the primary transceiver circuitry 20, and secondary receive signals from the primary antenna 12A are provided to the common node C of the second multiplexer 16B and forwarded to the secondary receiver circuitry 22.

From the above description, it is clear that primary transmit signals are forwarded via either the first antenna swapping switching element SW_AS1 or the second antenna swapping switching element SW_AS2 in the antenna swapping circuitry 14, while secondary receive signals are forwarded via either the third antenna swapping switching element SW_AS3 or the fourth antenna swapping switching element SW_AS4 in the antenna swapping circuitry 14. This may be problematic in some situations. Specifically, when the primary transmit signal is a low-band signal, the first antenna swapping switching element SW_AS1 and the second antenna swapping switching element SW_AS2 may generate harmonic distortion. Since the primary transmit signal is a low-band signal, one or more of these harmonics may be located within a mid/high-band receive signal that is being received simultaneously. Accordingly, this harmonic distortion may couple into a primary or secondary mid/high-band receive signal and cause problems such as desensitization of the primary transceiver circuitry 20 and/or the secondary receiver circuitry 22.

The distortion caused by the first antenna swapping switching element SW_AS1 and the second antenna swapping switching element SW_AS2 may be caused in an on-state of the switching element due to the on-state resistance $R_{ON}$ thereof, and may be caused in an off-state of the switching element due to the off-state capacitance $C_{OFF}$ thereof. Generally, the on-state resistance $R_{ON}$ of a switching element is inversely proportional to the off-state capacitance $C_{OFF}$ thereof. This is due to the structure of a switching element. Generally, a switching element includes multiple switching devices (e.g., bipolar junction transistors, field-effect transistors, or the like), which are coupled in parallel with one another. Each switching device is associated with a channel width. Providing twice the number of switching devices in a switching element will effectively double the on-state resistance $R_{ON}$ thereof while halving the off-state capacitance $C_{OFF}$. Doubling the channel width of each switching device in a switching element will effectively half the on-state resistance $R_{ON}$ while doubling the off-state capacitance $C_{OFF}$. Since the first antenna swapping switching element SW_AS1 and the second antenna swapping switching element SW_AS2 are used in both the on-state and the off-state thereof in the presence of low-band primary transmit signals, the on-state resistance $R_{ON}$ and the off-state capacitance $C_{OFF}$ of these switching elements must be balanced to minimize the generation of harmonics in both states. In other words, harmonic distortion in either one of the on-state and the off-state cannot be minimized at the expense of the other. This results in each one of the first antenna swapping switching element SW_AS1 and the second antenna swapping switching element SW_AS2 generating a moderate amount of harmonic distortion in both the on-state and the off-state thereof, and thus decrease the linearity of signals passed via the antenna swapping circuitry 14.

Accordingly, there is a need for RF front end circuitry with improved antenna swapping circuitry to increase linearity.

SUMMARY

The present disclosure relates to antenna swapping circuitry, and specifically to antenna swapping circuitry including improvements to the linearity thereof. In one embodiment, antenna swapping circuitry includes a first pole, a second pole, a first throw, a second throw, and a number of switching elements. A first switching element is coupled between the first pole and the first throw. A second switching element is coupled between the first pole and the second throw. A third switching element is coupled between the second pole and the first throw. A fourth switching element is coupled between the second pole and the second throw. A linearity of the first switching element and the fourth switching element is higher in a closed state of operation than in an open state of operation. A linearity of the second switching element and a third switching element is higher in an open state of operation than in a closed state of operation. By optimizing each one of the first switching element and the fourth switching element for increased linearity in the closed state and optimizing the second switching element and the third switching element for increased linearity in the open state, these switching elements can be used in these states to pass low-band primary transmit signals, which increases the linearity of the antenna swapping circuitry.

In one embodiment, radio frequency (RF) front end circuitry includes transceiver switching circuitry, antenna swapping circuitry, multiplexer circuitry coupled between the transceiver switching circuitry and the antenna swapping circuitry, and switch control circuitry coupled to the transceiver switching circuitry and the antenna swapping circuitry. The antenna swapping circuitry includes a first pole, a second pole, a first throw, a second throw, and a number of switching elements. A first switching element is coupled between the first pole and the first throw. A second switching element is coupled between the first pole and the second throw. A third switching element is coupled between the second pole and the first throw. A fourth switching element is coupled between the second pole and the second throw. In a first low-band transmit mode, the switch control circuitry is configured to provide a primary low-band transmit signal at the first pole of the antenna swapping circuitry via the transceiver switching circuitry and forward the primary low-band transmit signal to the first throw via the first switching element in the antenna swapping circuitry. In a second low-band transmit mode, the switch control circuitry is configured to provide a primary low-band transmit signal at the second pole of the antenna swapping circuitry via the transceiver switching circuitry and forward the primary low-band transmit signal to the second throw via the fourth switching element in the antenna swapping circuitry. By providing a primary low-band transmit signal to either the first pole or the second pole of the antenna swapping circuitry such that antenna swapping is done by the transceiver circuitry, the first switching element and the fourth switching element may always be closed in the presence of a primary low-band transmit signal, while the second switching element and the third switching element may always be open in the presence of a primary low-band transmit signal. Accordingly, the first switching element and the fourth switching element may be optimized to increase linearity in the on-state thereof, while the second switching element and the third switching element may be optimized to increase linearity in the off-state thereof. Accordingly, the linearity of the RF front end circuitry may be significantly improved when transmitting low-band signals.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
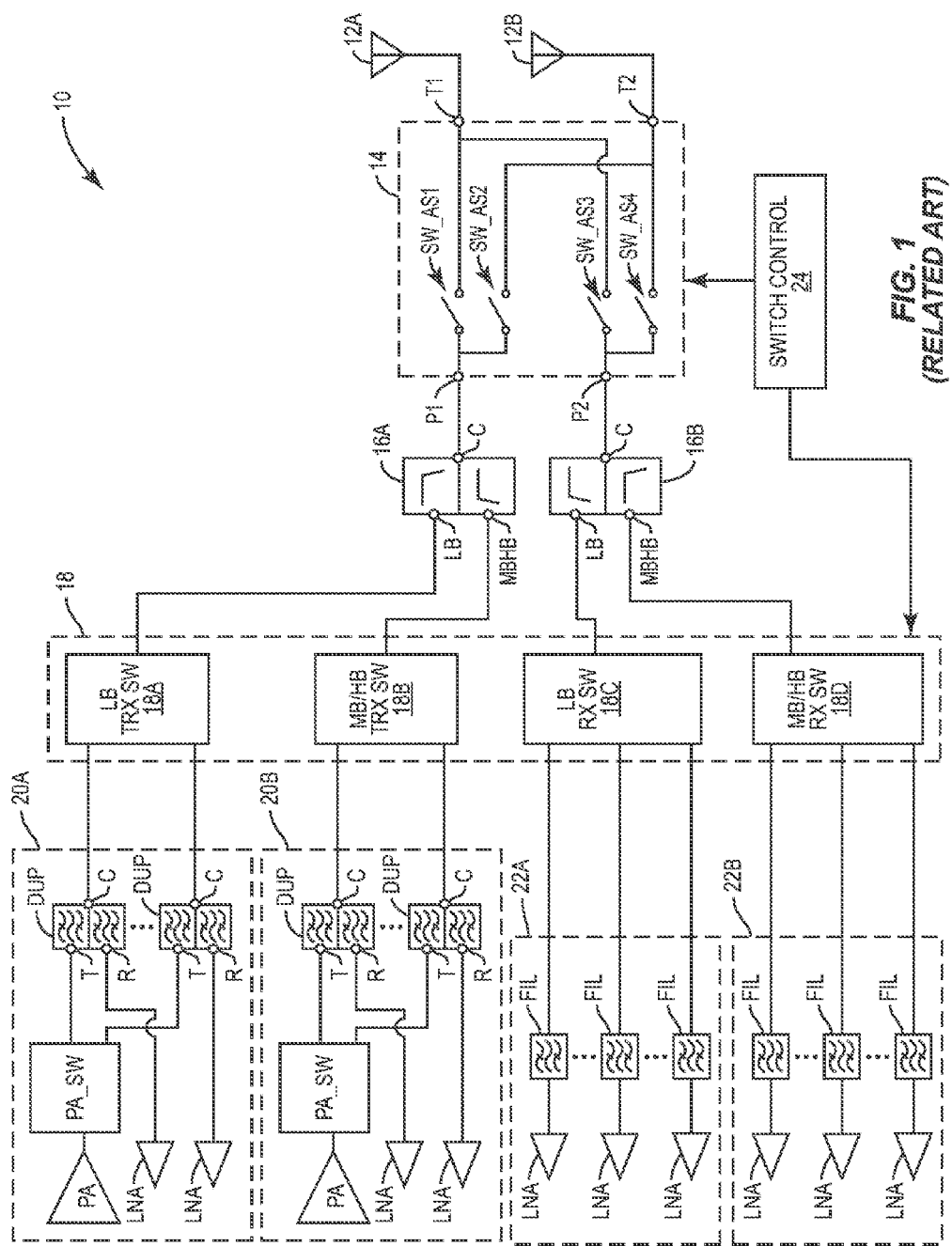
FIG. 1 is a functional schematic of conventional radio frequency (RF) front end circuitry.
Figure 2:
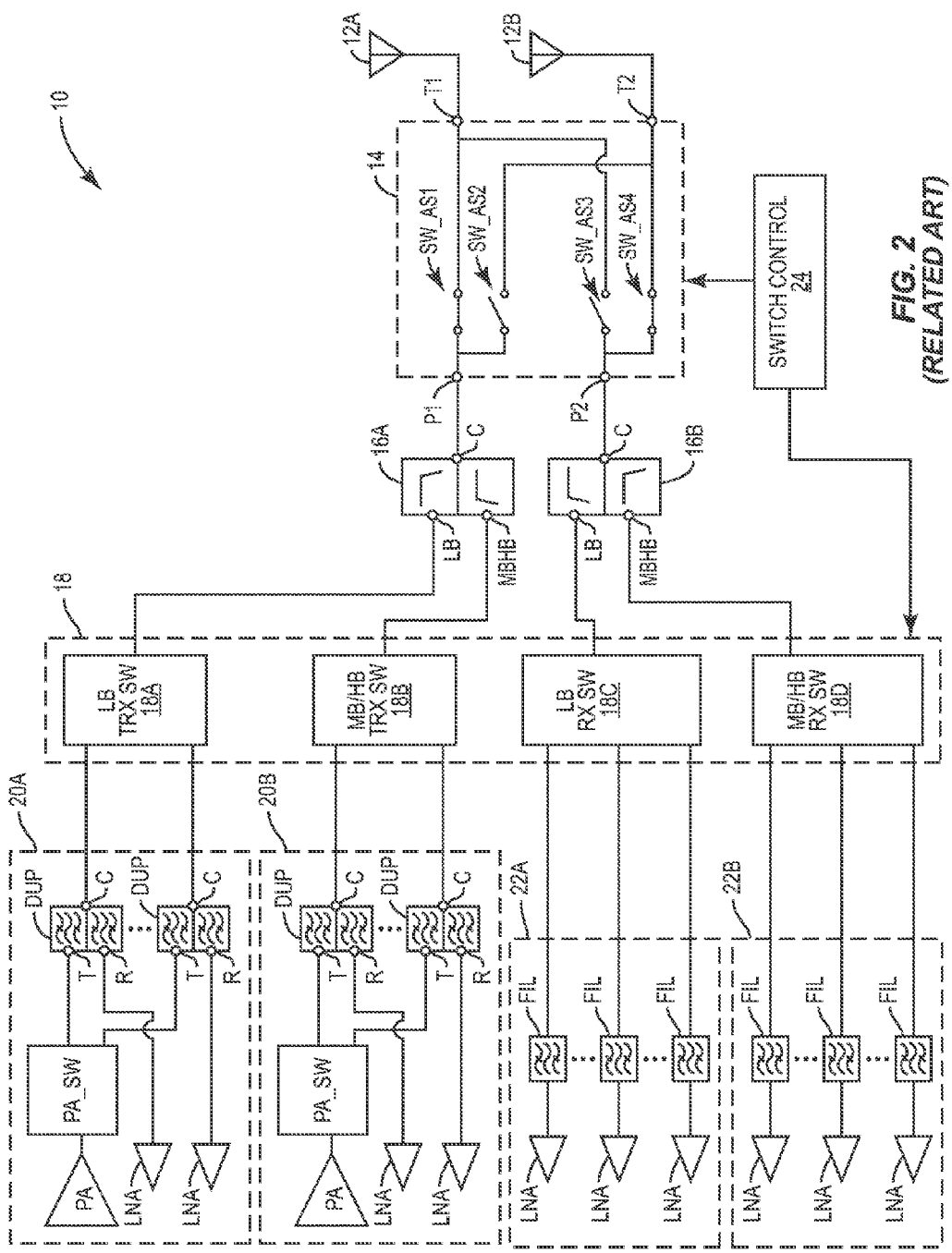
FIG. 2 is a functional schematic of conventional RF front end circuitry.
Figure 3:
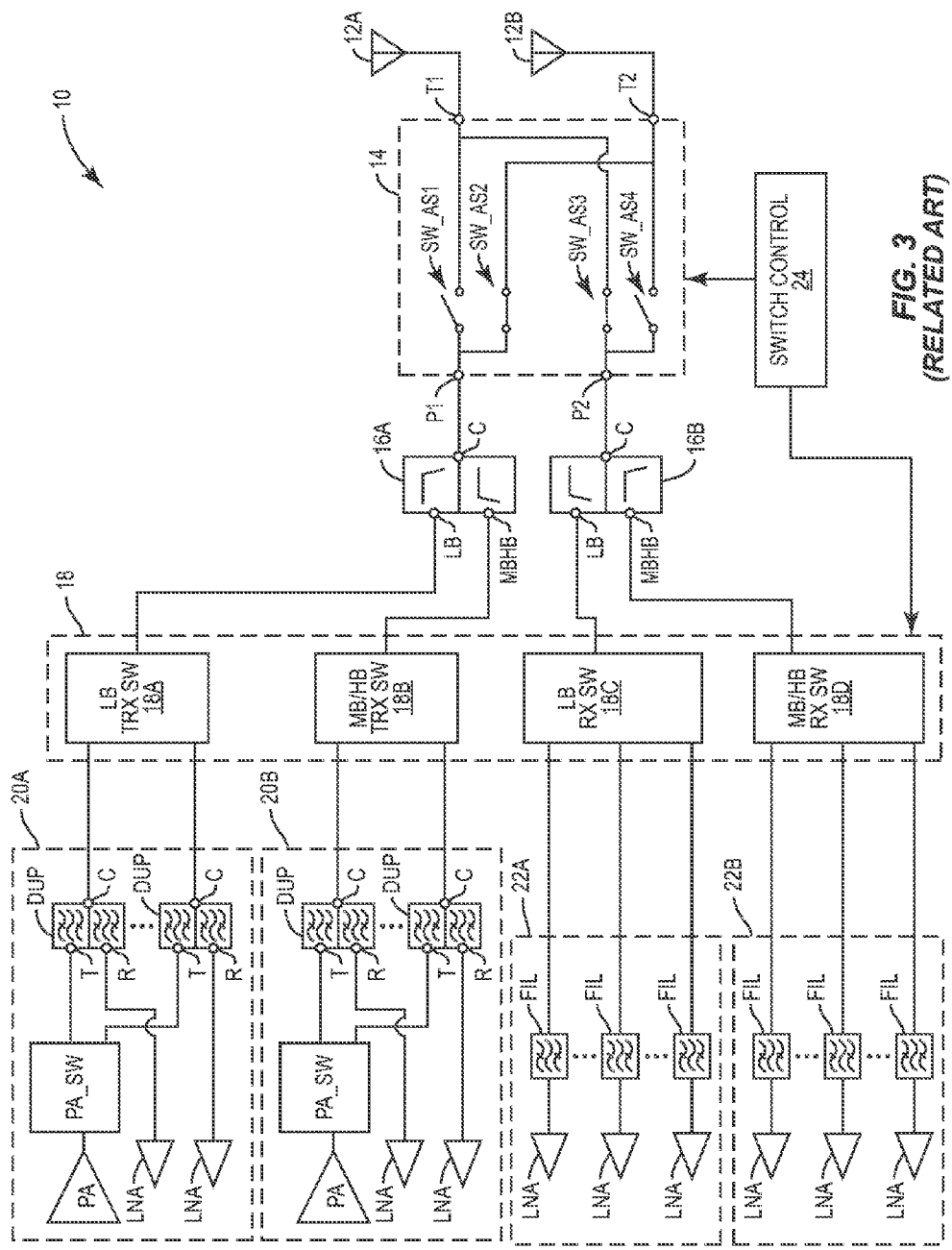
FIG. 3 is a functional schematic of conventional RF front end circuitry.
Figure 4:
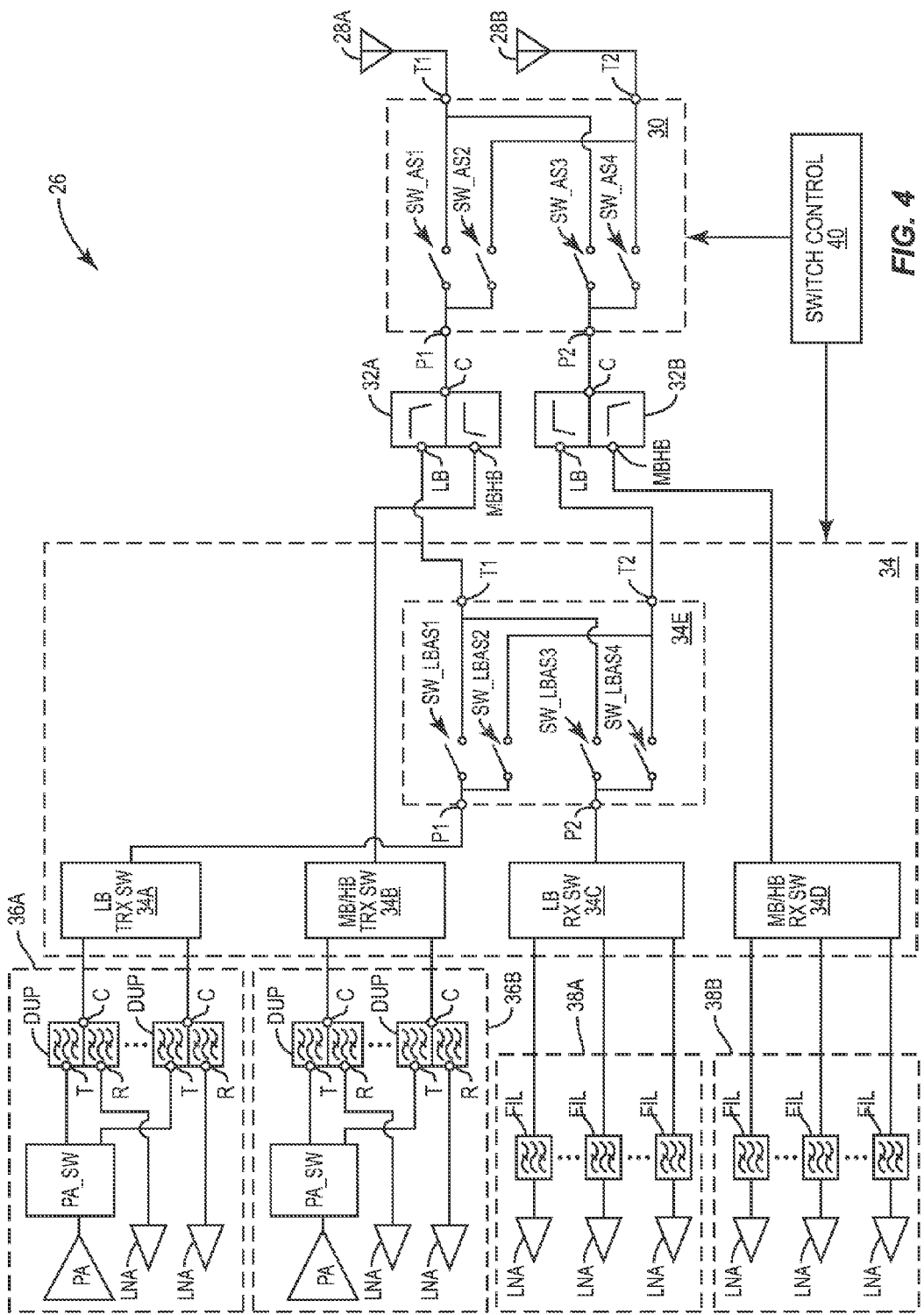
FIG. 4 is a functional schematic of RF front end circuitry according to one embodiment of the present disclosure.

FIG. 4 is a functional schematic of radio frequency (RF) front end circuitry 26. The RF front end circuitry 26 includes a primary antenna 28A, a secondary antenna 28B, antenna swapping circuitry 30, multiplexer circuitry 32, transceiver switching circuitry 34, primary transceiver circuitry 36, secondary receiver circuitry 38, and switch control circuitry 40. The antenna swapping circuitry 30 is coupled between the multiplexer circuitry 32, the primary antenna 28A, and the secondary antenna 28B. The transceiver switching circuitry 34 is coupled between the multiplexer circuitry 32, the primary transceiver circuitry 36, and the secondary receiver circuitry 38. Each one of the antenna swapping circuitry 30 and the transceiver switching circuitry 34 are shown as a dual-pole dual-throw (DP2T) switch, however, other switch configurations may similarly be used without departing from the principles of the present disclosure. The switch control circuitry 40 is coupled to the antenna swapping circuitry 30 and the transceiver switching circuitry 34.

The multiplexer circuitry 32 includes a first multiplexer 32A and a second multiplexer 32B. Each one of the first multiplexer 32A and the second multiplexer 32B include a low-band node LB, a mid/high-band node MBHB, and a common node C, and are configured to pass low-band signals between the low-band node LB and the common node C, pass mid/high-band signals between the mid/high-band node MBHB and the common node C, and attenuate other signals.

The primary transceiver circuitry 36 includes low-band primary transceiver circuitry 36A and mid/high-band primary transceiver circuitry 36B. Similarly, the secondary receiver circuitry 38 includes low-band secondary receiver circuitry 38A and mid/high-band secondary receiver circuitry 38B. The transceiver switching circuitry 34 includes low-band primary transceiver switching circuitry 34A, mid/high-band primary transceiver switching circuitry 34B, low-band secondary receiver switching circuitry 34C, mid/high-band secondary receiver switching circuitry 34D, and low-band antenna swapping circuitry 34E. The low-band primary transceiver switching circuitry 34A is coupled between the low-band primary transceiver circuitry 36A and the low-band antenna swapping circuitry 34E. The mid/high-band primary transceiver switching circuitry 34B is coupled between the mid/high-band primary transceiver circuitry 36B and the mid/high-band node MBHB of the first multiplexer 32A. The low-band secondary receiver switching circuitry 34C is coupled between the low-band secondary receiver circuitry 38A and the low-band antenna swapping circuitry 34E. The mid/high-band secondary receiver switching circuitry 34D is coupled between the mid/high-band secondary receiver circuitry 38B and the mid/high-band node MBHB of the second multiplexer 32B. The low-band antenna swapping circuitry 34E is coupled between the low-band primary transceiver switching circuitry 34A, the low-band secondary receiver switching circuitry 34C, the low-band node LB of the first multiplexer 32A, and the low-band node LB of the second multiplexer 32B. In some configurations, the primary antenna 28A and the secondary antenna 28B may be located on opposite ends of a mobile communication device in which the RF front end circuitry 26 is used. The primary transceiver circuitry 36 may be located near the primary antenna 28A and the second transceiver circuitry 38 may be located near the secondary antenna 28B in order to reduce the distance between the components and thus improve performance. Shielded signal paths such as those provided by a coaxial cable may connect the primary transceiver circuitry 36 and the secondary transceiver circuitry 38, for example, via the transceiver switching circuitry 34. Such a configuration does not change the connections shown in FIG. 6.

The low-band antenna swapping circuitry 34E includes a first pole P1, a second pole P2, a first throw T1, a second throw T2, and a number of low-band antenna swapping switching elements SW_LBAS. The first pole P1 of the low-band antenna swapping circuitry 34E is coupled to the low-band primary transceiver switching circuitry 34A. The second pole P2 of the low-band antenna swapping circuitry 34E is coupled to the low-band secondary receiver switching circuitry 34C. The first throw T1 of the low-band antenna swapping circuitry 34E is coupled to the low-band node LB of the first multiplexer 32A. The second throw T2 of the low-band antenna swapping circuitry 34E is coupled to the low-band node LB of the second multiplexer 32B. A first low-band antenna swapping switching element SW_LBAS1 is coupled between the first pole P1 and the first throw T1. A second low-band antenna swapping switching element SW_LBAS2 is coupled between the first pole P1 and the second throw T2. A third low-band antenna swapping switching element SW_LBAS3 is coupled between the second pole P2 and the first throw T1. A fourth low-band antenna swapping switching element SW_LBAS4 is coupled between the second pole P2 and the second throw T2.

Notably, while the low-band antenna swapping circuitry 34E is shown including four low-band antenna swapping switching elements SW_LBAS arranged in a particular configuration, the present disclosure is not so limited. That is, the low-band antenna swapping circuitry 34E may include any number of switching elements arranged in any number of configurations without departing from the principles herein. Further, while the low-band antenna swapping circuitry 34E is shown separate from the other switching circuitry in the transceiver switching circuitry 34, the functionality of any of the switching circuitry in the transceiver switching circuitry 34 may be separated or combined according to well known principles. Finally, while the low-band antenna swapping circuitry 34E is shown as part of the transceiver switching circuitry 34, the low-band antenna swapping circuitry 34E may be provided independently of the transceiver switching circuitry 34 or integrated with any other portion of the RF front end circuitry 26.

The antenna swapping circuitry 30 includes a first pole P1, a second pole P2, a first throw T1, a second throw T2, and a number of antenna swapping switching elements SW_AS1-SW_AS4. A first antenna swapping switching element SW_AS1 is coupled between the first pole P1 and the first throw T1. A second antenna swapping switching element SW_AS2 is coupled between the first pole P1 and the second throw T2. A third antenna swapping switching element SW_AS3 is coupled between the second pole P2 and the first throw T1. A fourth antenna swapping switching element SW_AS4 is coupled between the second pole P2 and the second throw T2. The first pole P1 is coupled to the common node C of the first multiplexer 32A. The second pole P2 is coupled to the common node C of the second multiplexer 32B. The first throw T1 is coupled to the primary antenna 28A. The second throw T2 is coupled to the secondary antenna 28B.

While the antenna swapping circuitry 30 is shown including a specific number of antenna swapping switching elements SW_AS arranged in a particular manner, the present disclosure is not so limited. Those skilled in the art will appreciate that the principles of the present disclosure apply to antenna swapping circuitry having any number of antenna swapping switching elements SW_AS that are arranged in any manner.

The low-band primary transceiver circuitry 36A includes a number of duplexers DUP each including a transmit node T, a receive node R, and a common node C, power amplifier switching circuitry PA_SW, a power amplifier PA, and a number of low-noise amplifiers LNA. The power amplifier PA is coupled to the transmit node T of each one of the duplexers DUP via the power amplifier switching circuitry PA_SW. Each one of the low-noise amplifiers LNA is coupled to a receive node R of a different one of the duplexers DUP. Each one of the duplexers DUP is configured to pass transmit signals within one or more operating bands provided at the common node C to the transmit node T, pass receive signals within the one or more operating bands provided at the receive node R to the common node C, and attenuate other signals. A common node C of each one of the duplexers DUP is coupled to the low-band primary transceiver switching circuitry 34A.

The mid/high-band primary transceiver circuitry 36B similarly includes a number of duplexers DUP each including a transmit node T, a receive node R, and a common node C, power amplifier switching circuitry PA_SW, a power amplifier PA, and a number of low-noise amplifiers LNA. The power amplifier PA is coupled to the transmit node T of each one of the duplexers DUP via the power amplifier switching circuitry PA_SW. Each one of the low-noise amplifiers LNA is coupled to a receive node R of a different one of the duplexers DUP. Each one of the duplexers DUP is configured to pass transmit signals within one or more operating bands provided at the common node C to the transmit node T, pass receive signals within the one or more operating bands provided at the receive node R to the common node C, and attenuate other signals. A common node C of each one of the duplexers DUP is coupled to the mid/high-band primary transceiver switching circuitry 34B.

The low-band secondary receiver circuitry 38A includes a number of receiver filters FIL and a number of low-noise amplifiers LNA. Each one of the low-noise amplifiers LNA is coupled to a different one of the receiver filters FIL. Each one of the receiver filters FIL is in turn coupled to the low-band secondary receiver switching circuitry 34C. Further, each one of the filters FIL is configured to filter receive signals within one or more different operating bands.

The mid/high-band secondary receiver circuitry 38B similarly includes a number of receiver filters FIL and a number of low-noise amplifiers LNA. Each one of the low-noise amplifiers LNA is coupled to a different one of the receiver filters FIL. Each one of the receiver filters FIL is in turn coupled to the mid/high-band secondary receiver switching circuitry 34D. Further, each one of the filters FIL is configured to filter receive signals within one or more different operating bands.

As is apparent from the foregoing description of FIG. 4, the transceiver switching circuitry 34 includes low-band antenna swapping circuitry 34E that is not present in conventional RF front end circuitry. This low-band antenna swapping circuitry 34E allows for antenna swapping to be performed for low-band primary transmit signals before the multiplexer circuitry 32, which has several advantages that are discussed in detail below.

Figure 5:
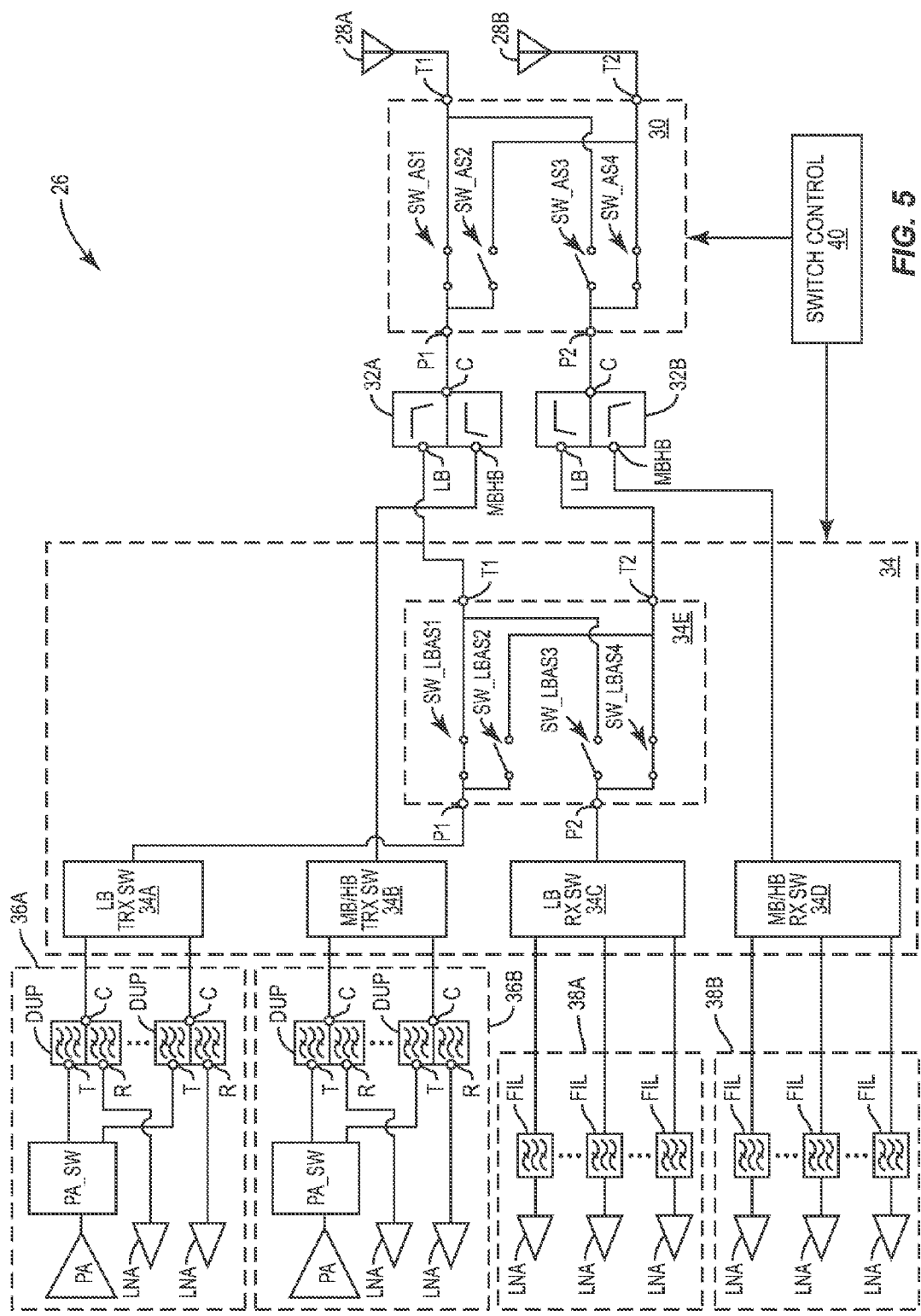
FIG. 5 is a functional schematic of RF front end circuitry according to one embodiment of the present disclosure.

When operating the primary antenna 28A as intended, the switch control circuitry 40 configures the antenna swapping circuitry 30 and the low-band antenna swapping circuitry 34E as shown in FIG. 5. Specifically, the first low-band antenna swapping switching element SW_LBAS1 and the fourth low-band antenna swapping switching element SW_LBAS4 are closed, while the second low-band antenna swapping switching element SW_LBAS2 and the third low-band antenna swapping switching element SW_LBAS3 are open. Further, the first antenna swapping switching element SW_AS1 and the fourth antenna swapping switching element SW_AS4 are closed, while the second antenna swapping switching element SW_AS2 and the third antenna swapping switching element SW_AS3 are open. Accordingly, the low-band primary transceiver switching circuitry 34A is coupled to the low-and node LB of the first multiplexer 32A, the low-band secondary receiver switching circuitry 34C is coupled to the low-band node LB of the second multiplexer 32B, the common node C of the first multiplexer 32A is coupled to the primary antenna 28A, and the common node C of the second multiplexer 32B is coupled to the secondary antenna 28B. Primary transmit signals provided at the common node C of the first multiplexer 32A from the primary transceiver circuitry 36 are therefore provided to the primary antenna 28A, primary receive signals from the primary antenna 28A are provided to the common node C of the first multiplexer 32A and forwarded to the primary transceiver circuitry 36, and secondary receive signals from the secondary antenna 28B are provided to the common node C of the second multiplexer 32B and forwarded to the secondary receiver circuitry 38. Notably, if a low-band primary transmit signal and/or low-band primary receiver signal is not being used, the first low-band antenna swapping switch SW_LBAS1 in the low-band antenna swapping circuitry 34E may be opened to reduce loading at the first multiplexer 32A. Similarly, if a low-band secondary receiver signal is not being used, the fourth low-band antenna swapping switch SW_LBAS4 in the low-band antenna swapping circuitry 34E may be opened to reduce loading at the second multiplexer 32B.

Figure 6:
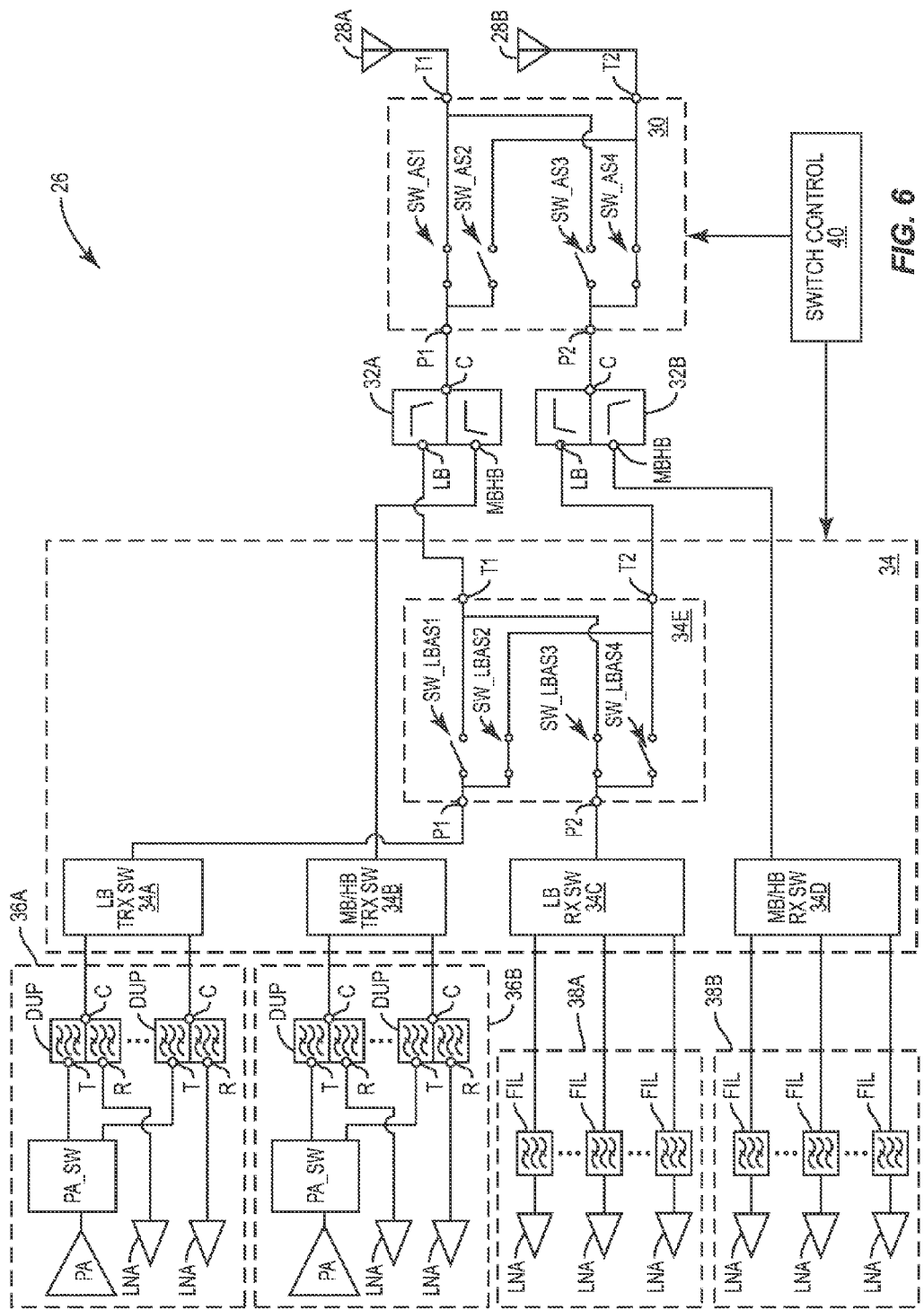
FIG. 6 is a functional schematic of RF front end circuitry according to one embodiment of the present disclosure.

When the primary antenna 28A and the secondary antenna 28B are switched, the configuration by the switch control circuitry 40 depends on whether a primary transmit signal is a low-band signal or a mid/high-band signal. If a primary transmit signal is a low-band signal, the switch control circuitry 40 configures the antenna swapping circuitry 30 and the low-band antenna swapping circuitry 34E as shown in FIG. 6. Specifically, the first low-band antenna swapping switching element SW_LBAS1 and the fourth low-band antenna swapping switching element SW_LBAS4 of the low-band antenna swapping circuitry 34E are open, while the second low-band antenna swapping switching element SW_LBAS2 and the third low-band antenna swapping switching element SW_LBAS3 are closed. Further, the first antenna swapping switching element SW_AS1 and the fourth antenna swapping switching element SW_AS4 of the antenna swapping circuitry 30 are closed, while the second antenna swapping switching element SW_AS2 and the third antenna swapping switching element SW_AS3 are open. Accordingly, the low-band primary transceiver switching circuitry 34A is coupled to the low-band node LB of the second multiplexer 32B, the low-band secondary receiver switching circuitry 34C is coupled to the low-band node LB of the first multiplexer 32A, the common node C of the first multiplexer 32A is coupled to the primary antenna 28A, and the common node C of the second multiplexer 32B is coupled to the secondary antenna 28B. Primary transmit signals provided at the common node C of the second multiplexer 32B from the primary transceiver circuitry 36 are therefore provided to the secondary antenna 28B, primary receive signals from the secondary antenna 28B are provided to the common node C of the second multiplexer 32B and forwarded to the primary transceiver circuitry 36, and secondary receive signals from the primary antenna 28A are provided to the common node C of the first multiplexer 32A and forwarded to the secondary receiver circuitry 38.

In short, when transmitting a low-band primary transmit signal, any antenna swapping is performed by the low-band antenna swapping circuitry 34E in the transceiver switching circuitry 34 before the multiplexer circuitry 32. The benefits to such an approach are numerous. First, since the first antenna swapping switching element SW_AS1 and the fourth antenna swapping switching element SW_AS4 are always closed in the presence of a low-band primary transmit signal and the second antenna swapping switching element SW_AS2 and the third antenna swapping switching element SW_AS3 are always open in the presence of a low-band primary transmit signal, the first antenna swapping switching element SW_AS1 and the fourth antenna swapping switching element SW_AS4 may be optimized to reduce harmonic generation in the closed state, while the second antenna swapping switching element SW_AS2 and the third antenna swapping switching element SW_AS3 may be optimized to reduce harmonic distortion in the open state. Specifically, a channel width of a number of switching devices in the first antenna swapping switching element SW_AS1 and the fourth antenna swapping switching element SW_AS4 may be increased to reduce the on-state resistance $R_{ON}$ of the switching elements, while the number of parallel-stacked switching devices in the second antenna swapping switching element SW_AS2 and the third antenna swapping switching element SW_AS3 may be increased to reduce the off-state capacitance $C_{OFF}$ of the switching elements. Since it is known that the first antenna swapping switching element SW_AS1 and the fourth antenna swapping switching element SW_AS4 will always be closed in the presence of a primary low-band transmit signal, these switching elements can be optimized to reduce the on-state resistance $R_{ON}$ at the expense of the off-state capacitance $C_{OFF}$ thereof. In other words, the off-state capacitance $C_{OFF}$ of the first antenna swapping switching element SW_AS1 and the fourth antenna swapping switching element SW_AS4 is no longer a design factor to be concerned with. Similarly, the on-state resistance $R_{ON}$ of the second antenna swapping switching element SW_AS2 and the third antenna swapping switching element SW_AS3 is no longer a design factor to be concerned with, and thus optimizations to the off-state capacitance $C_{OFF}$ of these switching elements may be made at the expense of the on-state resistance $R_{ON}$. In some embodiments, a third harmonic distortion generated by the first antenna swapping switching element SW_AS1 and the fourth antenna swapping switching element SW_AS4 may therefore be about 6 dB to 12 dB greater in the open state than in the closed state, while a third harmonic distortion generated by the second antenna swapping switching element SW_AS2 and the third antenna swapping switching element SW_AS3 may be about 6 dB to 12 dB greater in the closed state than in the open state.

Second, since the multiplexer circuitry 32 is located between the low-band antenna swapping circuitry 34E and the antennas 28, any harmonic distortion generated by the low-band antenna swapping switching elements SW_LBAS therein is filtered by the multiplexer circuitry 32. Accordingly, the low-band antenna swapping switching elements SW_LBAS do not need to be optimized to the same degree as the antenna swapping switching elements SW_AS in the antenna swapping circuitry 30. Providing the low-band antenna swapping circuitry 34E and operating it as described above when transmitting a low-band signal may provide significant improvements in linearity due to the reduction of harmonics by the antenna swapping switching elements SW_AS in the antenna swapping circuitry 30. For example, third harmonic distortion generated by the antenna swapping switching elements SW_AS may be reduced by about 6 dB to 12 dB using the foregoing approach in some embodiments.

Figure 7:
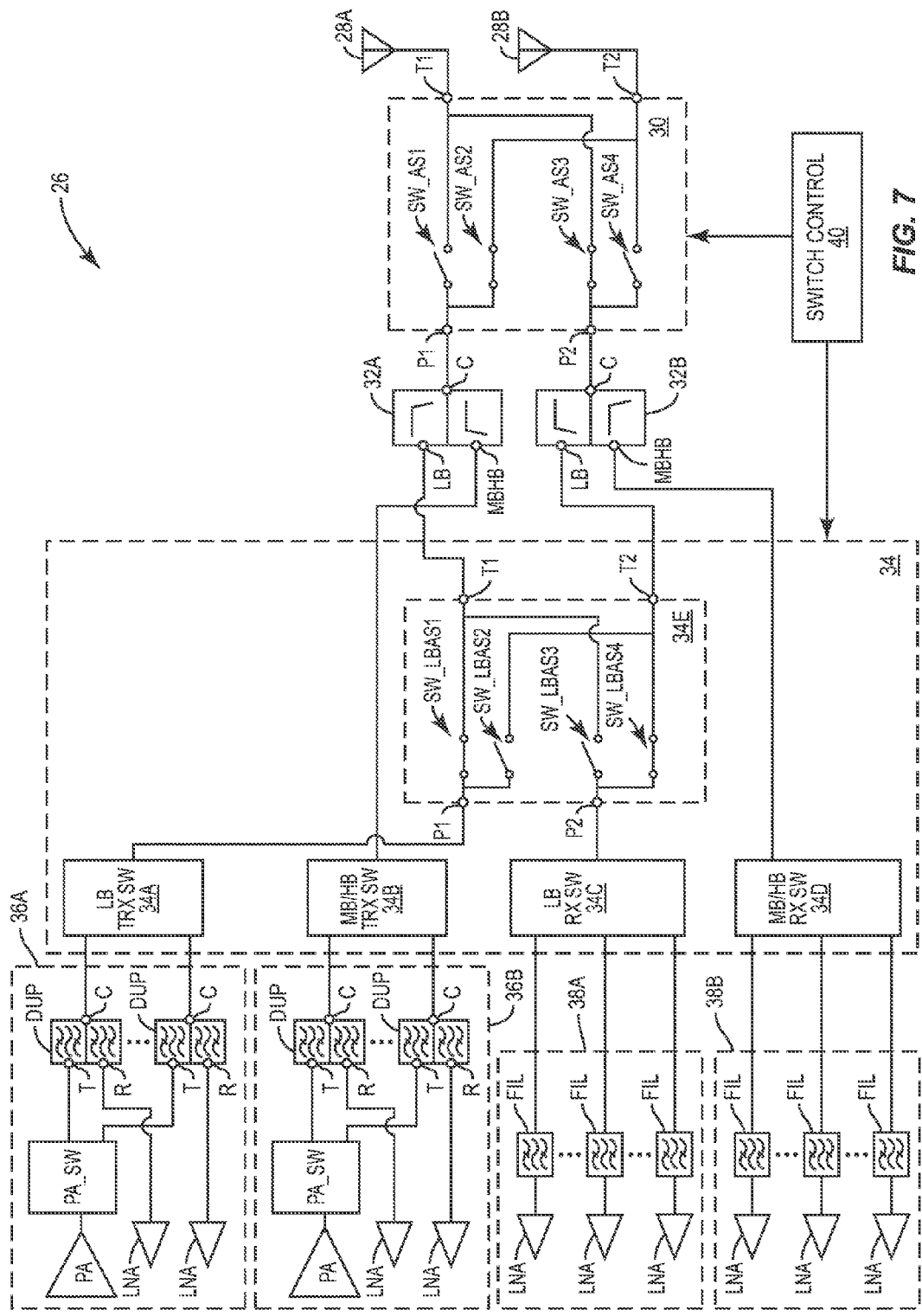
FIG. 7 is a functional schematic of RF front end circuitry according to one embodiment of the present disclosure.

If a primary transmit signal is not a low-band signal, the switch control circuitry 40 configures the antenna swapping circuitry 30 and the low-band antenna swapping circuitry 34E as shown in FIG. 7. Specifically, the first low-band antenna swapping switching element SW_LBAS1 and the fourth low-band antenna swapping switching element SW_LBAS4 are closed, while the second low-band antenna swapping switching element SW_LBAS2 and the third low-band antenna swapping switching element SW_LBAS3 are open. Further, the first antenna swapping switching element SW_AS1 and the fourth antenna swapping switching element SW_AS4 are open, while the second antenna swapping switching element SW_AS2 and the third antenna swapping switching element SW_AS3 are closed. Accordingly, the low-band primary transceiver switching circuitry 34A is coupled to the low-band node LB of the first multiplexer 32A, the low-band secondary receiver switching circuitry 34C is coupled to the low-band node LB of the second multiplexer 32B, the common node C of the first multiplexer 32A is coupled to the secondary antenna 28B, and the common node C of the second multiplexer 32B is coupled to the primary antenna 28A. Primary transmit signals provided at the common node C of the first multiplexer 32A from the primary transceiver circuitry 36 are therefore provided to the secondary antenna 28B, primary receive signals from the secondary antenna 28B are provided to the common node C of the first multiplexer 32A and forwarded to the primary transceiver circuitry 36, and secondary receive signals from the primary antenna 28A are provided at the common node C of the second multiplexer 32B and forwarded to the secondary receiver circuitry 38. If a primary low-band receive signal is not being used, the first low-band antenna swapping switching element SW_LBAS1 may be opened to reduce loading at the first multiplexer 32A. Similarly, if a secondary low-band receive signal is not being used, the fourth low-band antenna swapping switching element SW_LBAS4 may be opened to reduce loading at the second multiplexer 32B.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) front end circuitry comprising:
   transceiver switching circuitry;
   antenna swapping circuitry comprising:
      a first pole and a second pole;
      a first throw and a second throw; and
      a first switching element coupled between the first pole and the first throw, a second switching element coupled between the first pole and the second throw, a third switching element coupled between the second pole and the first throw, and a fourth switching element coupled between the second pole and the second throw; and
   multiplexer circuitry coupled between the transceiver switching circuitry and the antenna swapping circuitry; and
   switch control circuitry coupled to the transceiver switching circuitry and the antenna swapping circuitry and configured to:
      in a first low-band transmit mode, provide a primary low-band transmit signal at the first pole of the antenna swapping circuitry via the transceiver switching circuitry and forward the primary low-band transmit signal to the first throw via the first switching element in the antenna swapping circuitry; and
      in a second low-band transmit mode, provide a primary low-band transmit signal at the second pole of the antenna swapping circuitry via the transceiver switching circuitry and forward the primary low-band transmit signal to the second throw via the fourth switching element in the antenna swapping circuitry.

2. The RF front end circuitry of claim 1 further comprising a primary antenna coupled to the first throw and a secondary antenna coupled to the second throw.

3. The RF front end circuitry of claim 1 wherein a linearity of the first switching element and the fourth switching element at low-band frequencies is greater in a closed state than in an open state, and a linearity of the second switching element and the third switching element at low-band frequencies is greater in a closed state than in an open state.

4. The RF front end circuitry of claim 3 wherein a third harmonic distortion generated by the first switching element and the fourth switching element at low-band frequencies is 6 dB to 12 dB greater in the open state than in the closed state.

5. The RF front end circuitry of claim 4 wherein a third harmonic distortion generated by the second switching element and the third switching element at low-band frequencies is 6 dB to 12 dB greater in the closed state than in the open state.

6. The RF front end circuitry of claim 5 wherein each of the first switching element, the second switching element, the third switching element, and the fourth switching element include a plurality of switching devices, each of the switching devices having a particular channel width.

7. The RF front end circuitry of claim 6 wherein the channel width of the plurality of switching devices in each of the first switching element and the fourth switching element is greater than the channel width of the plurality of switching devices in each of the second switching element and the fourth switching element.

8. The RF front end circuitry of claim 7 wherein the plurality of switching devices in each of the second switching element and the third switching element is greater than the plurality of switching devices in each of the first switching element and the fourth switching element.

9. The RF front end circuitry of claim 1 wherein the switch control circuitry is further configured to:

in a first mid/high-band transmit mode, provide a mid/high-band transmit signal at the first pole of the antenna swapping circuitry via the transceiver switching circuitry and forward the primary mid/high-band transmit signal to the first throw via the first switching element in the antenna swapping circuitry; and in a second mid/high-band transmit mode, provide a mid/high-band transmit signal at the first pole of the antenna swapping circuitry via the transceiver switching circuitry and forward the primary mid/high-band transmit signal to the second throw via the second switching element.

10. The RF front end circuitry of claim 9 wherein a linearity of the first switching element and the fourth switching element at low-band frequencies is greater in a closed state than in an open state, and a linearity of the second switching element and the third switching element at low-band frequencies is greater in a closed state than in an open state.

11. The RF front end circuitry of claim 10 wherein a third harmonic distortion generated by the first switching element and the fourth switching element at low-band frequencies is 6 dB to 12 dB greater in the open state than in the closed state.

12. The RF front end circuitry of claim 11 wherein a third harmonic distortion generated by the second switching element and the third switching element at low-band frequencies is 6 dB to 12 dB greater in the closed state than in the open state.

13. The RF front end circuitry of claim 12 wherein a channel width of the plurality of switching devices in each of the first switching element and the fourth switching element is greater than a channel width of a plurality of switching devices in each of the second switching element and the fourth switching element.

14. The RF front end circuitry of claim 13 wherein the plurality of switching devices in each of the second switching element and the third switching element is greater than the plurality of switching devices in each of the first switching element and the fourth switching element.

* * * * *